United States Patent
Ramrajkar

(10) Patent No.: US 8,829,924 B2
(45) Date of Patent: Sep. 9, 2014

(54) METHOD AND APPARATUS FOR MONITORING PHYSICAL PROPERTIES

(75) Inventor: Naftaly Ramrajkar, Vancouver (CA)

(73) Assignee: Smart Autonomous Solutions, Inc., Vancouver, BC (CA)

( * ) Notice: Subject to any disclaimer, the term of this patent is extended or adjusted under 35 U.S.C. 154(b) by 246 days.

(21) Appl. No.: 13/589,969

(22) Filed: Aug. 20, 2012

(65) Prior Publication Data

US 2014/0049268 A1 Feb. 20, 2014

(51) Int. Cl.
*G01R 27/04* (2006.01)

(52) U.S. Cl.
USPC ............ 324/637; 73/514.31; 73/514.16; 73/514.24

(58) Field of Classification Search
USPC ........ 324/637, 633, 636, 702, 76.11, 96, 332, 324/344, 76.14, 652, 655, 668, 675, 708; 250/370.01, 492.1, 370.1, 370.09; 73/514.01, 514.16, 514.24; 333/231, 333/230, 219, 227
See application file for complete search history.

(56) References Cited

U.S. PATENT DOCUMENTS

| | | | |
|---|---|---|---|
| 5,386,714 A | | 2/1995 | Dames |
| 5,546,806 A | * | 8/1996 | Kain .......................... 73/514.31 |
| 5,750,903 A | * | 5/1998 | Ryhanen .................... 73/861.48 |
| 6,407,651 B1 | | 6/2002 | Wulff et al. |
| 6,727,787 B2 | | 4/2004 | Worth et al. |
| 6,798,216 B2 | * | 9/2004 | Jannsen et al. ................ 324/646 |
| 7,220,968 B2 | * | 5/2007 | Burger et al. ............ 250/370.01 |
| 7,347,101 B2 | | 3/2008 | Thomson et al. |
| 7,560,937 B2 | | 7/2009 | Bini et al. |
| 2007/0074580 A1 | | 4/2007 | Fallah-Rad et al. |

* cited by examiner

*Primary Examiner* — Melissa Koval
*Assistant Examiner* — Trung Nguyen
(74) *Attorney, Agent, or Firm* — Manelli Selter PLLC; Edward J. Stemberger

(57) ABSTRACT

This invention relates to methods and apparatus for measuring physical properties using microwave cavity sensors. In operation, a number of microwave cavity sensors are interrogated by a remote wireless unit in order to determine the current resonant frequency for the sensor. The current values for various parameters measured by the sensors, such as temperature, stress/stain, or the like, are determined by comparing the current resonant frequency to a first resonant frequency of the sensor, and thus, detect any change in the value of the selected parameter. In particular, the present invention is directed toward extending the range over which such measurements may be performed, using these types of sensors.

15 Claims, 6 Drawing Sheets

METHOD AND APPARATUS FOR MONITORING PHYSICAL PROPERTIES

FIELD OF THE INVENTION

This invention relates to methods and apparatus for measuring physical properties. The measurement system comprises a number of microwave cavity sensors connected to one or a plurality of radio antennas, which sensors may be interrogated by a remote wireless unit in order to provide measurement values. In particular, the present invention is directed toward extending the range over which such measurements may be performed.

DESCRIPTION OF THE PRIOR ART

There is an increasing requirement to monitor the status and integrity of large structures such as bridges, towers, electricity power lines and similar objects. The structures may be monitored to detect construction defects, to estimate the effects of aging, to provide early warning of deterioration, to optimize their operation in the presence of external effects such as temperature and wind-loading, or measure a variety of other parameters. The use of microwave cavity sensors attached to these structures has proven useful in this regard since these sensors do not require a source of power, do not require embedded wiring and can be interrogated remotely by wireless means.

U.S. Pat. No. 7,347,101 attributed to Thomson et al. discloses a method and apparatus for measuring the strain in a structure having an electromagnetic resonator. Thomson et al. disclose that a microwave cavity sensor having a particular resonant frequency can be used in conjunction with a remotely operated interrogator unit to measure the strain in a structure through wireless means.

US Patent Application 2007/0074580 attributed to Fallah-Rad et al. discloses a sensing system based on multiple resonant electromagnetic cavities. Fallah-Rad et al. disclose that microwave cavity sensors can be constructed to measure a variety of parameters such as strain, humidity, temperature and the like. The authors further disclose that multiple sensors can be attached to a single wireless antenna, further reducing the cost of implementation.

While the disclosures provided by Thomson et al. and Fallah-Rad et al. have proven useful, the application of the methods and apparatus so described has been limited by the shortness of range (distance between the sensor and the interrogation apparatus) that is inherent with microwave cavity sensors. Since these devices have no internal source of energy they are dependent on absorbing and then retransmitting any radio frequency energy that may impinge upon them.

To overcome these difficulties, it would be advantageous to provide a system for monitoring microwave cavity sensors having an extended range of operation.

SUMMARY OF THE INVENTION

Therefore, according to a first advantage of the present invention, said invention provides methods and apparatus for extending the range over which microwave cavity sensors can be monitored.

According to a further advantage of the present invention, said invention provides methods and apparatus for detecting the resonant frequency of a microwave cavity sensor.

According to a yet further advantage of the present invention, said invention provides methods and apparatus for selecting scanning frequencies adapted for detecting the resonant frequency of a microwave cavity sensor.

These and other advantages of the invention, which will become apparent herein, are fully or at least partially attained by the present invention as herein described. In particular, the present invention provides a method, and related apparatuses, wherein one or a plurality of microwave cavity sensors may be monitored by a single receiving device.

Accordingly, in one aspect, the present invention provides a method for extending the measurement range of a microwave cavity sensor to determine a parameter measurement value, said method comprising:
  a. transmitting a first interrogation signal at a first frequency, to a microwave cavity sensor having a first resonant frequency;
  b. measuring the strength of the signal re-radiated by said microwave cavity sensor attributable to said first interrogation signal;
  c. transmitting a second interrogation signal to said microwave cavity sensor, at a second frequency;
  d. measuring the strength of the signal re-radiated by said microwave cavity sensor attributable to said second interrogation signal;
  e. repeating steps (c) and (d) until a selected band of frequencies has been sampled for said microwave cavity sensor;
  f. analyzing the set of re-radiated signal strength measurements to determine the interrogation frequency at which the re-radiated signal strength is at its maximum;
  g. establishing a new resonant frequency of said microwave cavity sensor at the interrogation frequency at which the re-radiated signal strength is maximized; and
  h. comparing the new resonant frequency to said first resonant frequency, in order to determine a microwave cavity sensor parameter measurement value.

In a further aspect, the present invention also provides an apparatus for interrogating a microwave cavity sensor having a first resonant frequency, said apparatus comprising:
  a. a transmit chain capable of generating interrogation signals;
  b. a receive chain capable of receiving re-radiated signals;
  c. an antenna subsystem for transmitting said interrogation signals to said microwave cavity sensor at a variety of frequencies, and for receiving re-radiated signals from said microwave cavity sensor at each selected frequency; and
  d. a system controller for controlling said transmit chain and said receive chain so as to generate and receive interrogation and re-radiated signals, and wherein said system controller is capable of analysing the strength of said re-radiated signals at each of said frequencies so as to identify the frequency at which the re-radiated signal strength is maximized, and thereby determine a new resonant frequency of said microwave cavity sensor.

DESCRIPTION OF THE PREFERRED EMBODIMENTS

A typical microwave cavity sensor (MCS) may be similar in construction to a small section of waveguide such as is used in microwave radio communication systems. The MCS may be constructed from a variety of materials such as copper or aluminum and is arranged to have an internal cavity having a consistent cross-section. An external antenna is coupled with the cavity to enable the transfer of electromagnetic energy between the antenna and the cavity. The length of a typical cavity may range from one to ten centimeters and the diameter of the cross-section may be smaller than the length. The cavity may be unpressurised, may be pressurised with a gas such as argon, or may be operated in a vacuum. An MCS may be optimised to measure a particular parameter such as temperature, pressure, stress/strain, moisture, relative movement, the presence of a particular gas, or the like. It will be apparent to those skilled in the art that a wide variety of microwave cavity sensors are possible and that MCS construction, size, proportions and applications may extend beyond the examples described.

The present invention can be used in a wide variety of applications and in any application where microwave cavity sensors might be used. For example, in one exemplary embodiment of the present invention, the methods and apparatus are adapted to enable the monitoring of electric power lines for changes in one or a plurality of parameters including stress, strain and temperature. Said electric power lines may be arranged as single-phase or multi-phase circuits and may be equipped for alternating current (AC) or direct current (DC) operation. The monitoring of said parameters may enable the current carrying capacity of the power lines to be increased above what would otherwise be considered a safe value.

In another embodiment of the present invention, the methods and apparatus are adapted to enable the monitoring of bridges and similar structures for changes in one or a plurality of parameters including stress, strain and temperature. The monitoring of said parameters may be utilised to predict the operational lifetime of said structures and to schedule or postpone expenditures for repair or replacement. The methods and apparatus may also be adapted to measure displacement of components or sections of said structures to detect the progression of cracks or similar gaps pertaining to said structures.

In a further embodiment of the present invention, the methods and apparatus are adapted to enable the monitoring of pipelines and similar structures for changes in one or a plurality of parameters including stress, strain and temperature. The monitoring of said parameters may be utilised to predict the operational lifetime of said structures and to postpone expenditures for repair or replacement. The methods and apparatus may also be adapted to measure displacement of components or sections of said structures to detect the progression of cracks or similar gaps pertaining to said structures.

In a still further embodiment of the present invention, the methods and apparatus are adapted to enable the monitoring of air quality for the presence of hazardous gases including carbon monoxide, ozone, methane and radon.

In a yet still further embodiment of the present invention, the methods and apparatus are adapted to enable the monitoring of land areas for moisture and temperature levels. The monitoring of said parameters may be utilised, for example, to increase the efficiency of farming operations.

However, while these uses have been specifically mentioned, the skilled artisan will be well aware that the present application is equally applicable in a wide variety of other applications.

BRIEF DESCRIPTION OF THE DRAWINGS

The novel features which are believed to be characteristic of the present invention, as to its structure, organization, use and method of operation, together with further objectives and advantages thereof, will be better understood from the following drawings in which a presently preferred embodiment of the invention will now be illustrated by way of example. It is expressly understood, however, that the drawings are for the purpose of illustration and description only and are not intended as a definition of the limits of the invention. Moreover, specific embodiments of the invention will now be described, by way of example only, in association with the accompanying drawings in which.

DETAILED DESCRIPTION OF THE INVENTION

Figure 1:
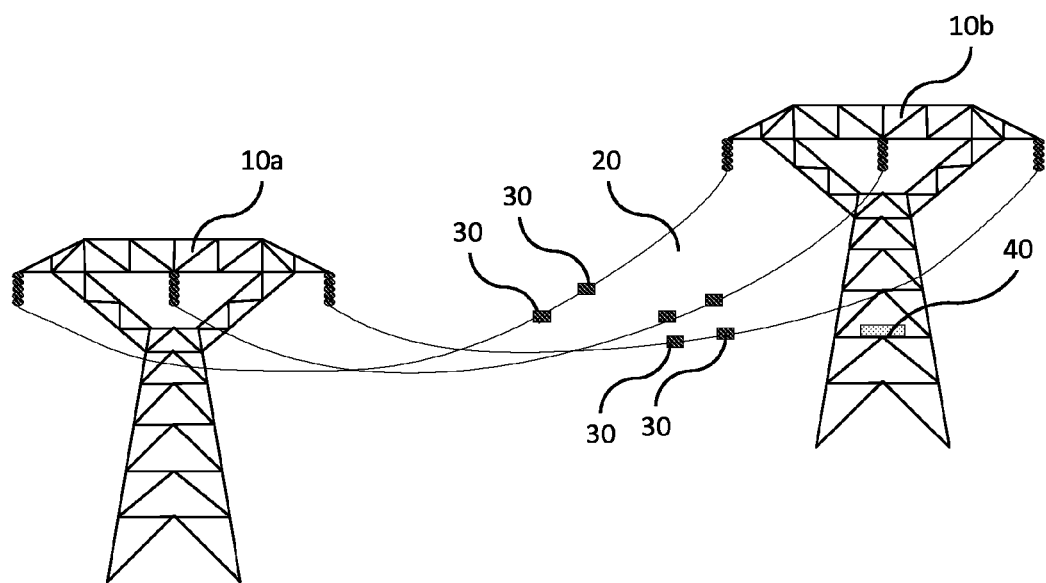
FIG. 1 is a block diagram of a typical monitoring system, according to the prior art.

FIG. 1 is a block diagram of a typical monitoring system, according to the prior art. In this arrangement, electric power transmission lines (20) are strung between transmission towers (10a, 10b). A plurality of microwave cavity sensors (30) are installed on each transmission line (20) and an interrogator unit (40) is installed on transmission tower (10b). Interrogator unit (40) transmits a signal to one or more sensors (30) at a frequency close to the resonant frequency of sensor (30). In accordance with the properties of a microwave cavity sensor, sensor (30) absorbs the transmitted signal and then retransmits the signal at its current resonant frequency after a relaxation period. Interrogator unit (40) receives the retransmitted signal, and then measures the difference in transmit and receive frequency to calculate stress, strain, temperature, humidity, gaseous content and other parameters that can be related to a change in the physical properties (such as change of length, or change in dielectric constant of the interior) of sensor (30). Multiple sensors (30), adapted for a particular type of measurement, can be attached to each transmission line.

Figure 2:
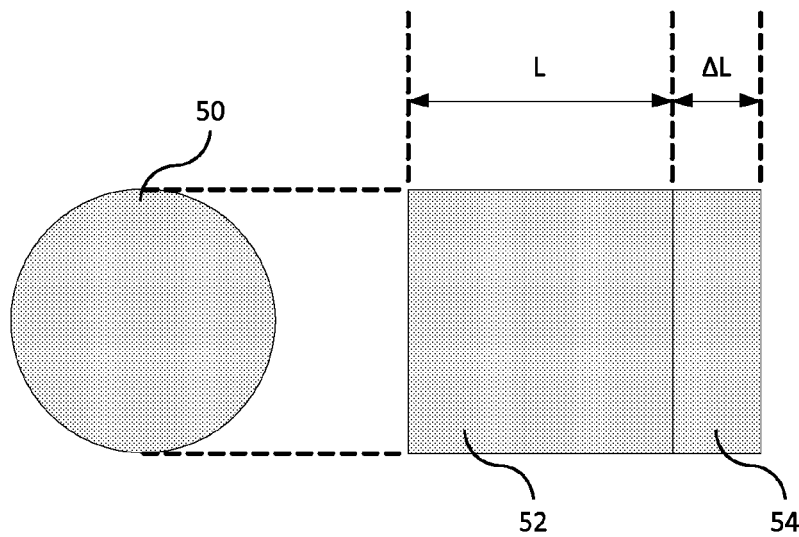
FIG. 2 provides cross-sectional views of a microwave cavity sensor, according to the prior art.

FIG. 2 provides cross-sectional views of a typical microwave cavity sensor, according to the prior art. The cross-section (50) of microwave cavity sensor (30) is shown as being round, but in practise, can be any suitable shape, including square, rectangular, or any other convenient shape. The longitudinal portion (52) of microwave cavity sensor (30) is chosen to be a length (L) which corresponds to a particular resonant frequency ($F_1$). In use, the length of longitudinal portion (50) is caused to increase to a modified length (54) according to the physical property (such as stress or temperature) that is to be measured. When the length of the cavity changes to $L+\Delta L$, the cavity resonates at a second frequency $F_2$, and the change in frequency from $F_1$ to $F_2$ allows the change in length to be quantified. It will be apparent to those skilled in the art that the change in length $\Delta L$ can be negative in value.

Figure 3:
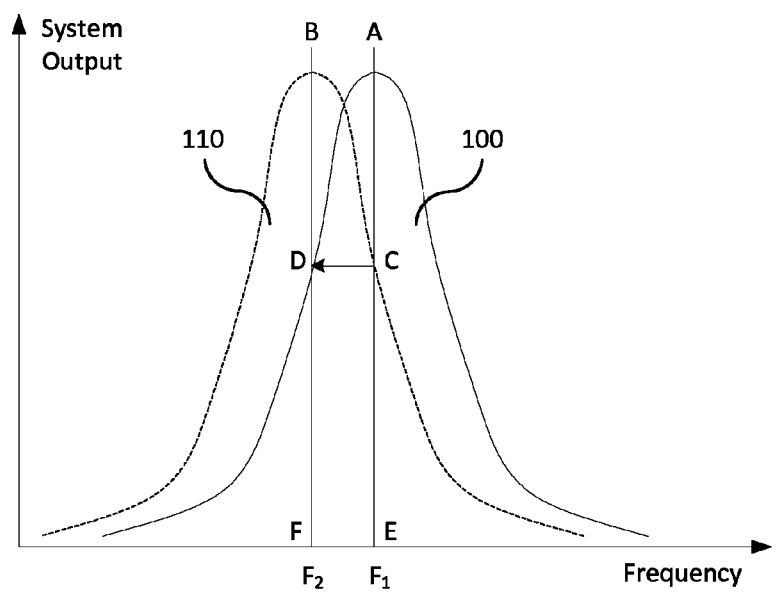
FIG. 3 is a plot of the frequency response of a typical microwave cavity sensor, according to the prior art.

FIG. 3 is a plot of the frequency response of a typical microwave cavity sensor adapted for temperature measurement, according to the prior art. In this arrangement, the frequency response of the sensor at temperature $T_1$ is represented by solid line (100). When the sensor is interrogated with a signal at resonant frequency $F_1$, the sensor absorbs the maximum energy from the interrogation signal and re-radiates this energy at its current resonant frequency, at an energy level represented in the drawing as energy level AE. If the sensor is interrogated with a signal at any other frequency, the amount of energy absorbed, and thus available to re-radiate, is less than the maximum.

When the temperature of the sensor is increased to $T_2$, the length of the sensor increases from a value (L) to a new value (L+ΔL) and the resonant frequency decreases to a new value $F_2$. The frequency response of the sensor is now represented by dotted line (110). It will be noticed that if the sensor is now radiated with original frequency $F_1$, the amount of energy that can be absorbed is represented by the value CE which is less than the value AE. The sensor will re-radiate the absorbed energy (CE) at new resonant frequency $F_2$ with energy level DF which is also less than the value AE. Again the change in frequency from $F_1$ to $F_2$ allows the change in temperature to be quantified. However, the reduction in the level of re-radiated energy corresponds to a reduction in the range or distance at which the re-radiated signal can be detected by interrogator unit (40) of FIG. 1.

In order to address this loss in energy and range caused by radiating the microwave cavity sensor at a frequency other than its (new) current resonant frequency, the present inventors have realized that this loss in energy and range can be overcome by tracking the sensor in the frequency domain, using a frequency scanning algorithm. According to this option, previous interrogator unit (40) of the prior art is replaced with an improved interrogator unit (500) (see FIG. 8) which operates in accordance with the present invention. Interrogator unit (500) is capable of generating an interrogator signal at a number of individual frequencies within a selected frequency band. The re-radiated signal from the microwave cavity sensor is monitored in order to determine the frequency at which the maximum signal is returned from the sensor, and thereby identify the "new" (or "current") resonant frequency of the sensor.

Various approaches can be taken to determine the new resonant frequency, and it will be apparent to those skilled in the art that a variety of frequency scanning algorithms for selecting the set of individual frequencies to be generated are possible.

Figure 4:
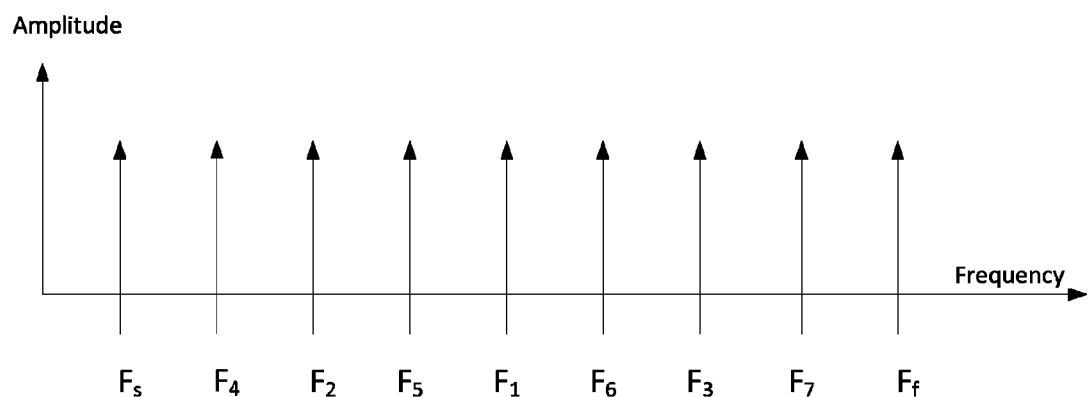
FIG. 4 is a frequency plot of a possible scanning algorithm, according to the present invention.

One preferred method for selecting the set of individual frequencies to be generated so as to determine the new resonant frequency is to use a scanning algorithm of the type which is shown and described in FIG. 4, and which is known as a half-frequency algorithm. Its operation will now be described in detail. Frequency $F_s$ is the frequency at which scanning starts and $F_f$ is the frequency at which scanning finishes. Then, $$F_1=(F_s+F_f)/2$$

$$F_2=(F_s+F_1)/2=(F_s+(F_s+F_f)/2)/2$$

$$F_3=(F_f+F_1)/2=(F_f+(F_s+F_f)/2)/2$$

$$F_4=(F_s+F_2)/2=(F_s+((F_s+(F_s+F_f)/2)/2)/2$$

$$F_5=(F_1+F_2)/2=((F_s+F_f)/2+(F_s+(F_s+F_f)/2)/2)/2.$$

The energy output level from the sensor is measured for each frequency, and the series repeats by interpolating between the previous values as shown. As a result, this series can be formulated to create an algorithm for driving an agile frequency source. In normal applications, a typical microwave cavity sensor has a 20 dB bandwidth of approximately 3 MHz. If the scanning algorithm is configured to step in frequency intervals equal to half of this bandwidth, there will be a high probability of detecting the sensor.

In a typical application, the frequency range (from $F_s$ to $F_f$) that must be covered may have a scanning bandwidth of 20 MHz and may be centered on a frequency in the region of 2.4 GHz. If a frequency interval of 1 MHz is adopted then a positive response will be detected within 20 attempts, in a worst case scenario. In practise, the centre frequency (typically F1) may be chosen based upon calibration of the sensor during its manufacture or installation. The centre frequency may also be based upon a previous measurement of the same sensor.

In any case, it will be apparent to those skilled in the art that the values quoted for frequency range, scanning bandwidth, centre frequency and frequency interval are exemplary and that other values for these parameters may be chosen.

Figure 5:
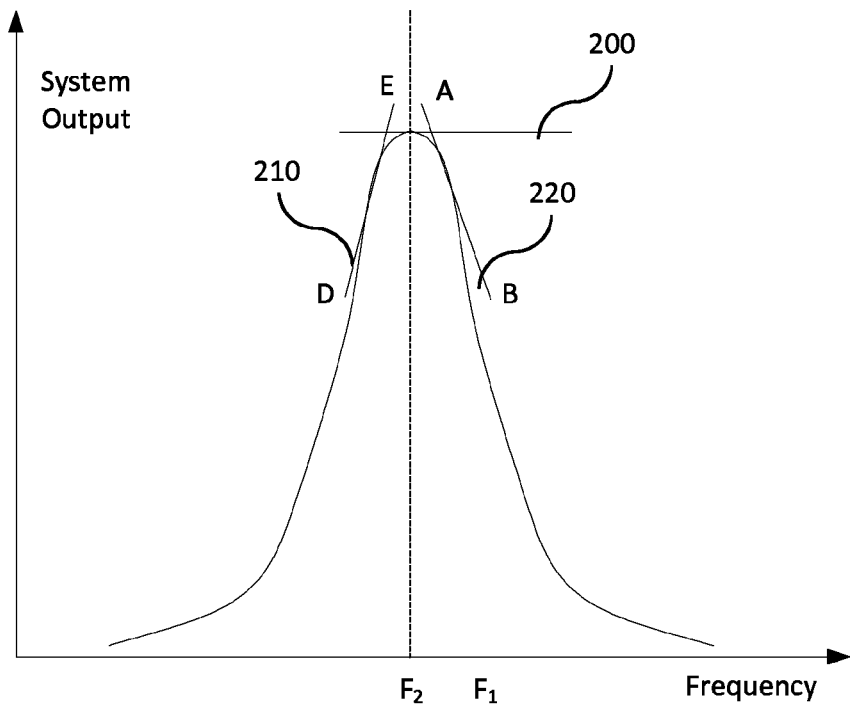
FIG. 5 is a plot of a possible frequency response of the output of a system according to the present invention.

FIG. 5 is a plot of a possible frequency response output from a system according to the present invention, as a result of implementing the frequency scanning algorithm, described in, for example, FIG. 4. It will be noticed that maximum output level is obtained when the interrogator frequency is $F_2$, corresponding to the shifted resonance frequency of a sensor whose temperature has been increased as described in FIG. 3. The peak of the curve can be determined by observing the point at which the slope (200) of the response curve is zero. However, due to noise and other random effects, the detection of a zero value may be difficult to detect. This problem may be eased by detecting equal but opposite values of the slope as indicated by tangents (or approximations thereto), such as, for example, those represented by DE (210) and AB (220). The resonant frequency may be assumed to lie halfway between these two values and further measurements may be made at smaller frequency increments to narrow in on the optimum value.

Figure 6:
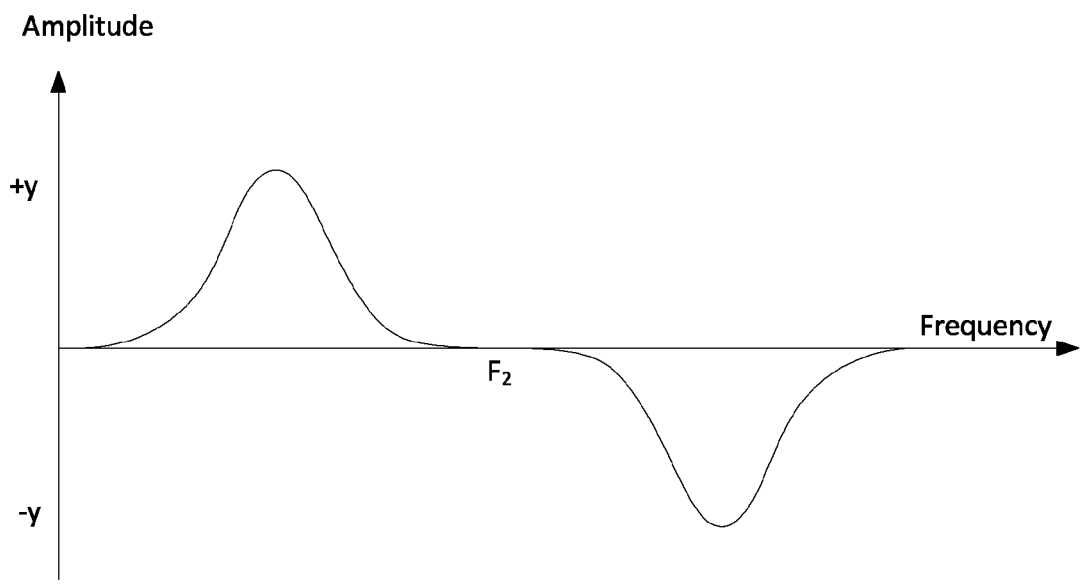
FIG. 6 is a plot of the first derivative of a possible frequency response of the output of a system according to the present invention.

FIG. 6 is a plot of the first derivative of a possible frequency response of the output of a system according to the present invention. The first derivative is obtained by plotting the change in output value (ΔV) against the corresponding change in frequency (ΔF). The first derivative is given by the formula $y(F)=\Delta V/\Delta F$ where $y(F)$ represents the value of the first derivative of the output at frequency (F).

It will be observed that the value of $y(F)$ changes sign from positive to negative at the resonant frequency of the sensor. This is a condition that is easily detected by typical measurement systems including those based on digital signal processing techniques.

Figure 7:
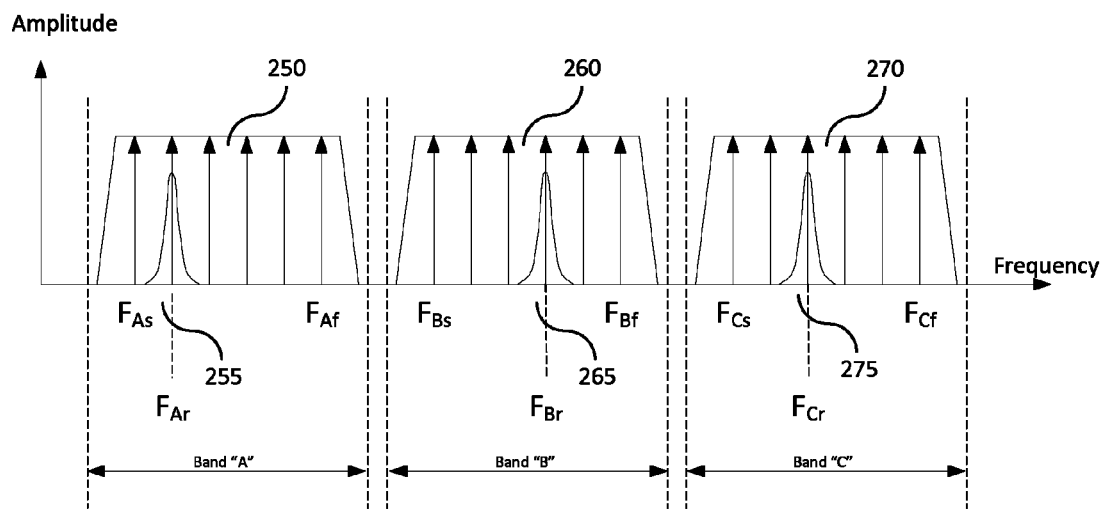
FIG. 7 is a frequency plot of a further scanning algorithm, according to the present invention.

FIG. 7 is a frequency plot of a further scanning algorithm, according to the present invention. According to this option, the scanning algorithm may be arranged to scan a plurality of frequency bands (250, 260 and 270) and to detect a plurality of resonant frequencies (255, 265 and 275) attributable to a plurality of sensors.

The entire frequency spectrum to be scanned is arranged into a plurality of frequency bands, herein identified as Band "A", Band "B" and Band "C". Each band is chosen to contain the likely resonant frequency ($F_{Ar}$, $F_{Br}$, or $F_{Cr}$) of an individual sensor within the set of sensors to be measured. The likely resonant frequency can be determined from a calibrated resonant frequency that was obtained when each sensor was installed or from a previous measurement of each sensor's resonant frequency. Each frequency band may be adjacent to the next frequency band, or may be separated from the next frequency band by a frequency gap. Within each frequency band, a frequency scanning algorithm such as that described in FIG. 4 may be used to determine the resonant frequency of the individual sensor For each frequency band, scanning may begin at a start frequency (for example $F_{As}$) and end at a finish frequency (for example $F_{Af}$). In situations where the frequency gaps are small or non-existent, a frequency scanning algorithm such as that described in FIG. 4 may be used across the entire spectrum, beginning at a start frequency (for example $F_{As}$) and ending at a finish frequency (for example $F_{Cf}$).

This method may be advantageous for scanning a plurality of sensors attached to an individual structure. In one embodiment of the present invention, a plurality of sensors may be attached to an individual power transmission line at a variety of points along its length. When each sensor is equipped to measure a singular parameter (such as temperature) then the method enables an average temperature along the length of the line to be computed by calculating the average of the temperature values derived from each individual sensor measurement. When each sensor is equipped to measure different parameters (such as conductor temperature, stress/strain and air temperature) then an entire set of measurements can be made more quickly. It will be apparent to those skilled in the art that the method is not limited to the three frequency bands used by way of example in FIG. 7 and that any number of sensors may be scanned in a single operation provided that none of their associated frequency bands overlap with that of another sensor.

Figure 8:
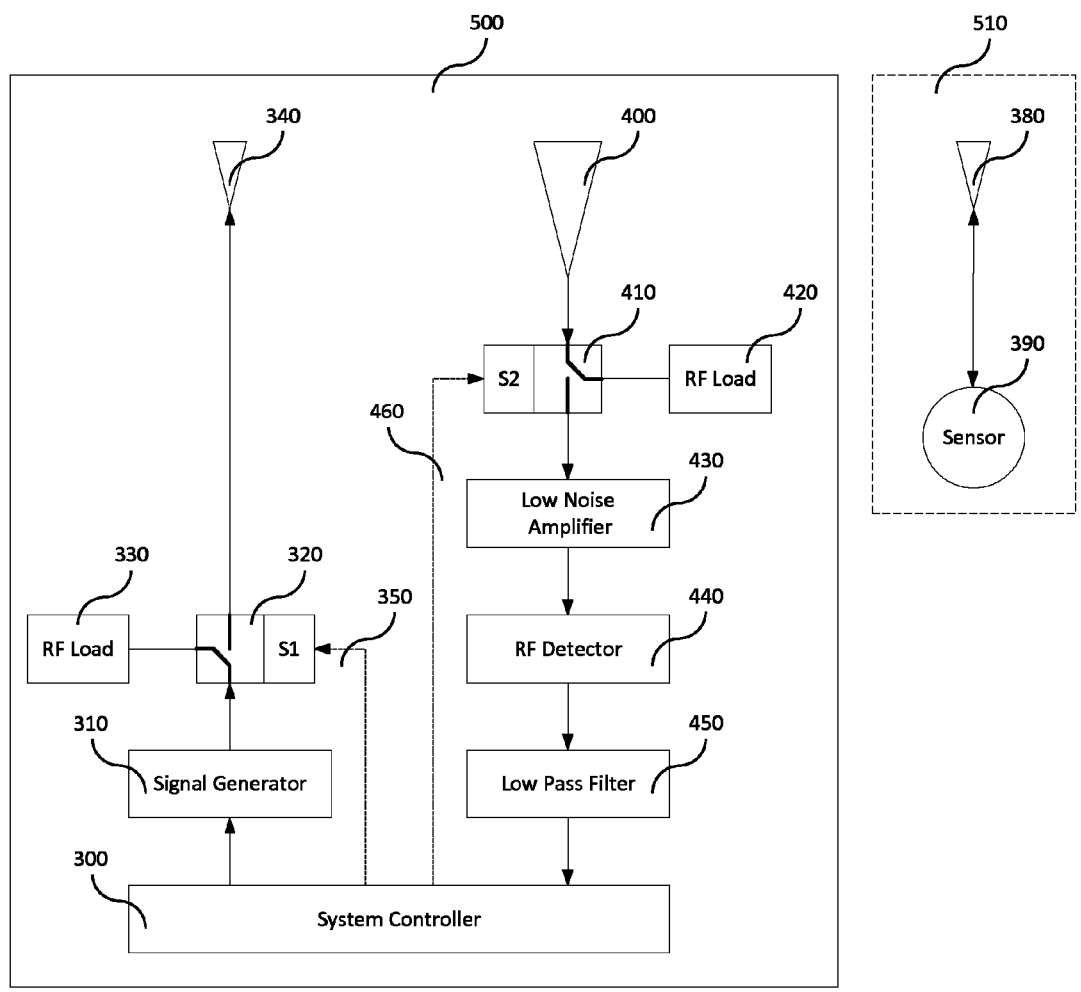
FIG. 8 is a block diagram of a first interrogator unit according to the present invention.

FIG. 8 is a block diagram of a first interrogator unit (500) according to the present invention, together with a prior art microwave cavity sensor (510). In this arrangement, unit (500) includes a system controller (300) for selecting the output frequency to be generated and for analyzing the response signal retransmitted and received from microwave cavity sensor (510). Sensor (510) is typical of those currently known and used in the art, and includes a microwave cavity section (390) together with a transmit and receive antenna (380).

The system controller (300) is coupled to signal generator (310) to produce the selected output frequency. The output of signal generator (310) is supplied to switch S1 (320) which is capable of providing the selected output frequency to transmitting antenna (340) or absorptive load (330). The characteristic impedance of load (330) is chosen to prevent signal reflections from occurring. A typical value for this impedance is 50 ohms.

The output signal produced by transmitting antenna (340) is collected by sensor antenna (380) of sensor (510) and delivered to sensor section (390). The electromagnetic energy is absorbed by sensor section (390) and then re-radiated after a short delay at the resonant frequency of sensor section (390). The re-radiated energy is coupled to sensor antenna (380) and, thus, transmitted back to interrogator unit (500).

A portion of the electromagnetic energy transmitted by sensor antenna (380) is captured by receiving antenna (400) of interrogator unit (500). Receiving antenna (400) is coupled to switch S2 (410) which is capable of delivering the received re-radiated signal to low noise amplifier (430) or absorptive load (420). The characteristic impedance of load (420) is chosen to prevent signal reflections from occurring.

Low noise amplifier (430) is adapted to amplify the received signal while introducing a minimum amount of additional noise. RF detector (440) is coupled to low noise amplifier (430) and is adapted to detect the presence of an RF signal within the frequency band of interest. Low pass filter (450) is coupled to RF detector (440) and is adapted to remove high frequency noise from the detected signal. The output of low pass filter (450) is delivered to system controller (300) where additional signal processing and display functions may be performed.

The energy level of the received signal can then be determined for each output frequency level, and the energy levels compared in the manner previously discussed in order to determine the resonant frequency for sensor (510).

In this arrangement, it should be noted that the transmitting antenna (340) and the receiving antenna (400) may not be identical. Since governments may regulate the maximum amount of power that may be transmitted in a particular frequency band, transmitting antenna (340) may be adapted so that the maximum permitted power is not exceeded in any particular direction. Receiving antenna (400), however, is not limited by government regulation and may be adapted to receive the maximum amount of power radiated from the sensor under interrogation. Therefore, in a preferred embodiment, receiving antenna (400) is larger than transmitting antenna (340) or is otherwise designed to provide higher gain than transmitting antenna (340). The gain of receiving antenna (400) may typically lie within a range from 10 dB to 30 dB. In a preferred embodiment, the gain of receiving antenna (400) may be 20 dB+/−5 dB. It will be apparent to those skilled in the art though, that the values for the gain of the receiving antenna are exemplary and that other values may be selected.

Also in this arrangement, it should be noted that switch S1 (320) is also directly controlled by system controller (300), by way of control line (350). Switch S2 (410) is similarly controlled by system controller (300) by way of control line (460). In the idle state, switch S1 (320) is set so that any signals produced by signal generator (310) are absorbed by RF load (330). When the system is ready to generate an interrogation signal, switch S1 (320) is set to an active state in which signal generator (310) is connected to transmitting antenna (340) for a short period of time. Switch S1 (320) is then returned to the idle state. In this manner, a pulse of RF energy is transmitted by transmitting antenna (340).

Also in the idle state, switch S2 (410) is set so that any signals received by receiving antenna (400) are absorbed by RF load (420). When the system is ready to receive a re-radiated interrogation signal, switch S2 (410) is set to an active state in which receiving antenna (400) is connected to low noise amplifier (430) for a period of time. Switch S2 (410) is then returned to the idle state. In this manner, a pulse of re-radiated RF energy is received and delivered through receiver chain (430, 440 and 450) to system controller (300).

System controller (300) is designed to advantageously control the timing of switch control lines (350) and (460) to produce the optimum quality of the received signal. Switch S2 (410) is arranged to be set to the active state after a short delay following the setting of switch S1 (320) to the active state. This delay can be selected to eliminate signals reflected or re-radiated from objects that are closer to antennas (340, 400) than the targeted sensor (510).

System controller (300) may be comprised of a computer capable of generating a scanning algorithm and analyzing the received signal strength resulting from the generated signals. System controller (300) is preferably equipped with a series of analog and/or digital outputs for controlling signal generator (310) and switches S1 and S2 (320, 410). System controller (300) is further preferably equipped with analog and/or digital inputs for receiving the output of low pass filter (450). System controller (300) may also be provided with additional inputs and outputs for monitoring and controlling the operation of interrogator unit (500).

The operation of system controller (300) will now be further explained by way of example using the algorithm of FIG. 4 for selecting the output frequencies. System controller (300) first initializes the system by setting switch S1 (320) to connect signal generator (310) to RF load (330) and by setting switch S2 (410) to connect receiving antenna (400) to RF load (420). In this configuration (which we shall term the "closed" position) no energy is radiated and no energy is detected. System controller (300) then instructs signal generator (310) to generate a signal at frequency $F_s$. After a short delay to allow the signal to stabilize, system controller (300) opens switch S1 (320) for a brief period to allow a pulse of RF energy to be delivered to transmitting antenna (340). The duration of said pulse of RF energy may be varied across a range with typical values lying between 200 ns and 2000 ns. In a particular preferred embodiment the pulse duration is chosen to be 500 ns.

Once the pulse of RF energy is complete and switch S1 has been closed, system controller (300) waits a further guard period before opening switch S2 (410) to enable the signal received by receive antenna (400) to be delivered to receive chain (430, 440, 450). The duration of said guard period may be varied across a range with typical values lying between 20 ns and 200 ns. In a particular preferred embodiment the guard period is chosen to be 50 ns.

Once the guard period has expired, system controller (300) records the output of low pass filter (450) and analyzes the received signal strength to determine whether re-radiated energy from sensor (510) has been detected. System controller (300) then repeats this process at a different frequency as determined by the frequency scanning algorithm. The process is repeated as many times as is necessary to cover the target frequency band and to determine the resonant frequency of sensor (510).

System controller (300) may compare the results of several frequency scans to obtain the best estimate of the resonant frequency of sensor (510). System controller (300) may initiate further frequency scans to determine the resonant frequencies of a plurality of sensors (510). System controller (300) may further process the measurement results to determine the physical value (such as temperature or stress/strain) represented by the measured resonant frequency. The results may then be presented to the user in any desired format, such as by using a tabular or graphical form presented through a display, printer or remote monitoring device. Alternatively, the data can be analyzed to determine whether to initiate an alarm condition, using any suitable parameters.

It will be noted, that as a result of the change of the method for interrogating the microwave cavity sensor described in the present invention, the range for interrogating the sensor can be increased. For example, whereas the operational distance between interrogator unit (500) and sensor (510) is limited in the prior art to approximately 10 meters under typical conditions, the advantages introduced by the present invention will increase the operational distance up to 100 meters or more.

Figure 9:
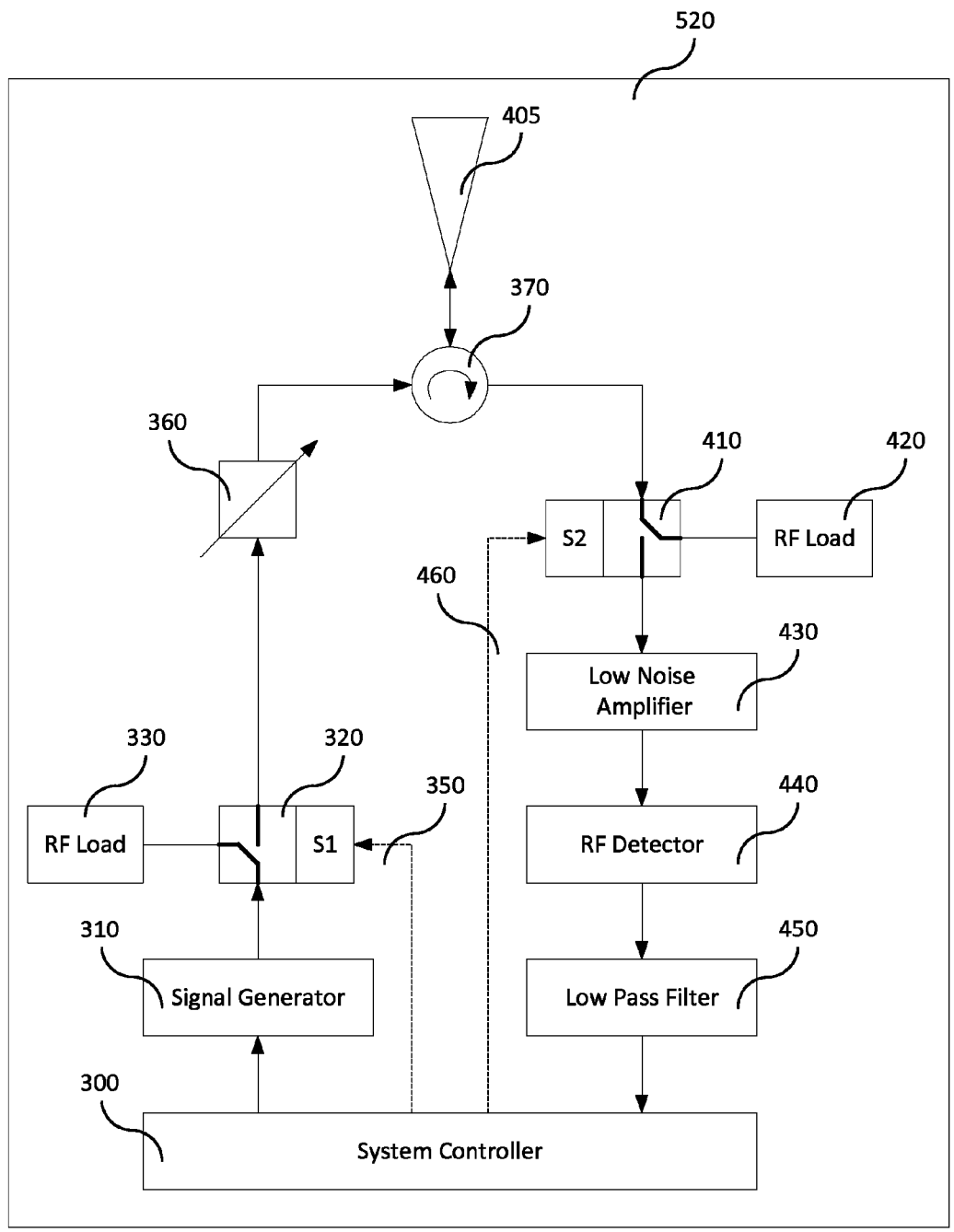
FIG. 9 is a block diagram of a further interrogator unit according to the present invention.

A further modified version of interrogator (500) is shown in FIG. 9, which is a block diagram of a further interrogator unit (520), also in accordance with the present invention. In this arrangement, the transmitting antenna (340) and receiving antenna (400) of FIG. 8 are replaced by attenuator (360), directional coupler (370) and shared antenna (405). This arrangement operates in a similar manner to that of FIG. 8 with the following exceptions. When switch S1 (320) is in the active mode, the output of signal generator (310) is fed through attenuator (360) and directional coupler (370) to shared antenna (405). The value of attenuator (360) can be set to compensate for any gain provided by shared antenna (405) and can thereby maintain the transmitted power levels within regulatory limits. The gain of shared antenna (405) may be the same as that of receiving antenna (400) of FIG. 8, or may be chosen to be a lower or higher value.

When switch S2 (410) is in the active mode, signals received by shared antenna (405) are passed through directional coupler (370) to low noise amplifier (430). This arrangement enables a single high gain antenna (405) to be used and delivers the benefit of higher received signal strength while maintaining transmitted signal strength within allowable limits.

Thus, it is apparent that there has been provided, in accordance with the present invention, microwave cavity sensor measurement technology which fully satisfies the goals, objects, and advantages set forth hereinbefore. Therefore, having described specific embodiments of the present invention, it will be understood that alternatives, modifications and variations thereof may be suggested to those skilled in the art, and that it is intended that the present specification embrace all such alternatives, modifications and variations as fall within the scope of the appended claims.

Additionally, for clarity and unless otherwise stated, the word "comprise" and variations of the word such as "comprising" and "comprises", when used in the description and claims of the present specification, is not intended to exclude other additives, components, integers or steps. Further, the invention illustratively disclosed herein suitably may be practiced in the absence of any element which is not specifically disclosed herein.

Moreover, words such as "substantially" or "essentially", when used with an adjective or adverb is intended to enhance the scope of the particular characteristic; e.g., substantially planar is intended to mean planar, nearly planar and/or exhibiting characteristics associated with a planar element.

Further, use of the terms "he", "him", or "his", is not intended to be specifically directed to persons of the masculine gender, and could easily be read as "she", "her", or "hers", respectively.

Also, while this discussion has addressed prior art known to the inventor, it is not an admission that all art discussed is citable against the present application.

I claim:

1. A method for extending the measurement range of a microwave cavity sensor to determine a parameter measurement value, said method comprising:
   a. transmitting a first interrogation signal at a first frequency, to a microwave cavity sensor having a first resonant frequency;
   b. measuring the strength of the signal re-radiated by said microwave cavity sensor attributable to said first interrogation signal;
   c. transmitting a second interrogation signal to said microwave cavity sensor, at a second frequency;
   d. measuring the strength of the signal re-radiated by said microwave cavity sensor attributable to said second interrogation signal;
   e. repeating steps (c) and (d) until a selected band of frequencies has been sampled for said microwave cavity sensor;
   f. analyzing the set of re-radiated signal strength measurements to determine the interrogation frequency at which the re-radiated signal strength is at its maximum;
   g. establishing a new resonant frequency of said microwave cavity sensor at the interrogation frequency at which the re-radiated signal strength is maximized; and h. comparing the new resonant frequency to said first resonant frequency, in order to determine a microwave cavity sensor parameter measurement value.

2. A method, as claimed in claim 1, wherein said second and subsequent frequencies are selected according to a half-frequency algorithm process.

3. A method, as claimed in claim 1, wherein the strength of signal re-radiated by said microwave cavity sensor is plotted against the frequency of the interrogation signal to produce a frequency response curve.

4. A method, as claimed in claim 3, wherein the resonant frequency of said microwave cavity sensor is determined by identifying the point at which the slope of said frequency response curve is zero.

5. A method, as claimed in claim 3, wherein the resonant frequency of said microwave cavity sensor is determined by identifying the point at which the first derivative of said frequency response curve passes through zero.

6. A method as claimed in claim 1 wherein a plurality of sensor are scanned, with frequencies selected according to a scanning algorithm, in order to detect a plurality of new resonant frequencies attributable to said plurality of sensors.

7. An apparatus for interrogating a microwave cavity sensor having a first resonant frequency, said apparatus comprising:
   a. a transmit chain capable of generating interrogation signals;
   b. a receive chain capable of receiving re-radiated signals;
   c. an antenna subsystem for transmitting said interrogation signals to said microwave cavity sensor at a variety of frequencies, and for receiving re-radiated signals from said microwave cavity sensor at each selected frequency; and
   d. a system controller for controlling said transmit chain and said receive chain so as to generate and receive interrogation and re-radiated signals, and wherein said system controller is capable of analysing the strength of said re-radiated signals at each of said frequencies so as to identify the frequency at which the re-radiated signal strength is maximized, and thereby determine a new resonant frequency of said microwave cavity sensor.

8. An apparatus, as claimed in claim 7, wherein said transmit chain comprises:
   a. a signal generator capable of generating a range of output frequencies;
   b. an RF load capable of absorbing radio energy; and
   c. a switch capable of connecting said signal generator to said RF load or to said antenna subsystem.

9. An apparatus, as claimed in claim 7, wherein said receive chain comprises:
   a. an RF load capable of absorbing radio energy;
   b. a low noise amplifier for increasing the amplitude of said received re-radiated signals;
   c. a switch capable of connecting said antenna subsystem to said RF load or to said low noise amplifier;
   d. a signal detector capable of measuring the value of said received re-radiated signals; and
   e. a processor for performing analysis of said detected received signals.

10. An apparatus, as claimed in claim 7, wherein said antenna subsystem comprises
   a. a transmitting antenna capable of transmitting said interrogation signals; and
   b. a receiving antenna capable of receiving said re-radiated signals.

11. An apparatus, as claimed in claim 7, wherein said antenna subsystem comprises
   a. an antenna capable of transmitting said interrogation signals and capable of receiving said re-radiated signals;
   b. a directional coupler capable of delivering said interrogation systems from said transmit chain to said antenna and further capable of delivering said re-radiated signals from said antenna to said receive chain; and
   c. an attenuator for reducing the power of said interrogation signals.

12. An apparatus, as claimed in claim 7, wherein said system controller is capable of selecting a sequence of frequencies determined by a half-frequency algorithm.

13. An apparatus as claimed in claim 7 wherein said system controller scans a plurality of frequency bands, with frequencies selected according to a scanning algorithm, in order to detect a plurality of new resonant frequencies attributable to a plurality of sensors.

14. An apparatus as claimed in claim 7, wherein a parameter measurement value is determined by comparing said first resonant frequency to said new resonant frequency.

15. An apparatus as claimed in claim 14 wherein said parameter is selected from temperature, pressure, stress/strain, moisture, relative movement, or the presence of a particular gas.

* * * * *